(12) United States Patent
Jeong et al.

(10) Patent No.: US 8,052,940 B2
(45) Date of Patent: Nov. 8, 2011

(54) APPARATUS FOR SYNTHESIZING CARBON NANOTUBES

(75) Inventors: Chung-Heon Jeong, Gyeonggi-do (KR);
Jong-Kwan Jeon, Gyeonggi-do (KR);
Suk-Won Jang, Seoul (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 206 days.

(21) Appl. No.: 12/569,027

(22) Filed: Sep. 29, 2009

(65) Prior Publication Data

US 2010/0129274 A1    May 27, 2010

(30) Foreign Application Priority Data

Nov. 26, 2008    (KR) ........................ 10-2008-0118182

(51) Int. Cl.
*B01J 35/02* (2006.01)
*B01J 8/18* (2006.01)
*B01J 19/00* (2006.01)
*D01F 9/12* (2006.01)
*C01B 31/02* (2006.01)

(52) U.S. Cl. ........ 422/211; 422/129; 422/139; 422/198; 422/224; 423/447.1; 423/447.2; 423/447.3; 423/450; 423/452; 423/453; 423/454; 423/455; 423/456; 423/457; 423/458; 423/459

(58) Field of Classification Search .................. 422/129, 422/139, 198, 211, 224; 423/447.1, 447.2, 423/447.3, 448, 449.1, 449.9, 450–459
See application file for complete search history.

(56) References Cited

U.S. PATENT DOCUMENTS 7,591,989 B2 *  9/2009  Smiljanic et al. .......... 423/447.1

FOREIGN PATENT DOCUMENTS

JP    2007246316 A  *  9/2007
KR    100830531 B1    5/2008

OTHER PUBLICATIONS

Machine translation of JP 2007-246316 A, which was published Sep. 27, 2007.*
Notice of Allowance, issued May 31, 2011, in counterpart Korean Patent Application No. 10-2008-0118182, 5 pgs.
English translation of abstract of Korean Publication No. 100830531 B1, 1 pg.

* cited by examiner

*Primary Examiner* — Walter Griffin
*Assistant Examiner* — Natasha Young
(74) *Attorney, Agent, or Firm* — Holland & Knight LLP; Brian J. Colandreo, Esq.

(57) ABSTRACT

Provided are an apparatus for synthesizing carbon nanotubes, the apparatus including a reaction tube that provides a space for carbon nanotubes and is formed vertically long, a heating unit that is formed at the outer side of the reaction tube, and heats the reaction tube, a gas-supply unit that sprays reaction gas for synthesizing the carbon nanotubes by reacting with catalysts positioned inside the reaction tube, an exhaustion unit that is connected to the upper portion of the reaction tube, and discharges non-reacted reaction gas for synthesizing the carbon nanotubes, and a blocking unit that is formed inside the reaction tube, discharges only the non-reacted reaction gas for synthesizing the carbon nanotubes to the exhaustion unit, and blocks the discharge of the carbon nanotubes and catalysts, in which the cross-section of the blocking unit is divided in a plurality of polygon structures, and downward-slanted blocking wings are formed at each divided cell.

10 Claims, 8 Drawing Sheets

APPARATUS FOR SYNTHESIZING CARBON NANOTUBES

CROSS-REFERENCE TO RELATED APPLICATION

This application claims priority from Korean Patent Application No. 10-2008-0118182 filed on Nov. 26, 2008 in the Korean Intellectual Property Office, the disclosure of which is incorporated herein by reference in its entirety.

BACKGROUND OF THE INVENTION

1. Field of the Invention

The present invention relates to an apparatus for synthesizing carbon nanotubes, and more particularly, to an apparatus for synthesizing carbon nanotubes, which discharges non-reacted gas for synthesizing carbon nanotubes to an exhaustion unit, and includes a blocking unit that blocks the discharge of synthesized carbon nanotubes and catalysts.

2. Description of the Related Art

Carbon nanotubes (CNT) is a carbon allotrope consisting of carbons existing on earth. One atom of carbon is coupled with another atom of carbon in a honeycomb pattern to form a tube shape, and the diameter of the tube is only a few nanometers. The carbon nanotubes (CNT) has good mechanical features, outstanding field-emitting features and highly-efficient hydrogen storage medium features, and is known as a promising new material.

Such carbon nanotubes can be manufactured by an advanced synthesizing technology, and some examples of the technology are the arc-discharge, laser vaporization, plasma enhanced chemical vapor deposition (PECVD), thermal chemical vapor deposition, electrolysis, and flame synthesis.

Generally, the process of manufacturing carbon nanotubes can be divided into the process of applying catalysts on a board where carbon nanotubes are synthesized, the process of synthesizing carbon nanotubes by inserting the board, where the catalysts have been applied, into a reaction tube and making the reaction gas react to the applied catalysts, and the process of returning carbon nanotubes that have been synthesized on the board.

The apparatus for synthesizing carbon nanotubes can be divided into a horizontal type and a vertical type depending on the form in which the reaction tube has been disposed. The apparatus for synthesizing carbon nanotubes with a vertical-type reaction tube is under active development due to the advantages of the size of the reaction tube, the consumption of reaction gas, and efficiency.

Further, the types of carbon nanotubes are divided into single-walled nanotubes (SWNT) and multi-walled nanotubes (MWNT) depending on the number of combinations that form the wall for forming the tube, and especially a bundle type where single-walled nanotubes are combined is called a robe nanotubes. The type of such carbon nanotubes can be determined according to the form of the catalyst reacting to reaction gas, i.e., the shape of the catalysts density, and the particle size, and the types of the used catalyst can be determined according to the method of producing the catalyst.

In a vertical-type carbon nanotubes synthesizer, the catalyst is positioned inside the reaction tube, and by spraying the reaction gas to the catalyst, the catalyst floats inside the reaction tube by the spraying pressure and the synthesis is done. Here, an exhaustion unit that discharges the remaining reaction gas and the remaining gas is positioned on the upper side of the reaction tube, and a blocking unit is formed so that only the reaction gas is discharged through the exhaustion unit, and the synthesized carbon nanotubes and the catalyst are not exhausted.

Here, there is a need for providing a blocking unit that effectively discharges the reaction gas to the outside, prevents the synthesized carbon nanotubes and the catalyst from being discharged, and prevents the carbon nanotubes and the catalyst from being piled up. It is because the productivity can be improved as the synthesized carbon nanotubes and the catalyst, which have not been discharged to the outside by the blocking unit, are synthesized inside the reaction tube again.

SUMMARY OF THE INVENTION

Aspects of the present invention provide a blocking unit that effectively discharges remnant reaction gas and effectively blocks synthesized carbon nanotubes and catalysts by forming blocking wings at each cell divided in a polygon structure in a vertical-type apparatus for synthesizing carbon nanotubes.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided an apparatus for synthesizing carbon nanotubes, the apparatus including a reaction tube that provides a space for carbon nanotubes and is formed vertically long, a heating unit that is formed at the outer side of the reaction tube, and heats the reaction tube, a gas-supply unit that sprays reaction gas for synthesizing the carbon nanotubes by reacting with catalysts positioned inside the reaction tube, an exhaustion unit that is connected to the upper portion of the reaction tube, and discharges non-reacted reaction gas for synthesizing the carbon nanotubes, and a blocking unit that is formed inside the reaction tube, discharges only the non-reacted reaction gas for synthesizing the carbon nanotubes to the exhaustion unit, and blocks the discharge of the carbon nanotubes and catalysts, in which the cross-section of the blocking unit is divided in a plurality of polygon structures, and downward-slanted blocking wings are formed at each divided cell.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, the present invention will be described with reference to drawings for explaining an apparatus for synthesizing carbon nanotubes according to the embodiments of the present invention.

Figure 1:
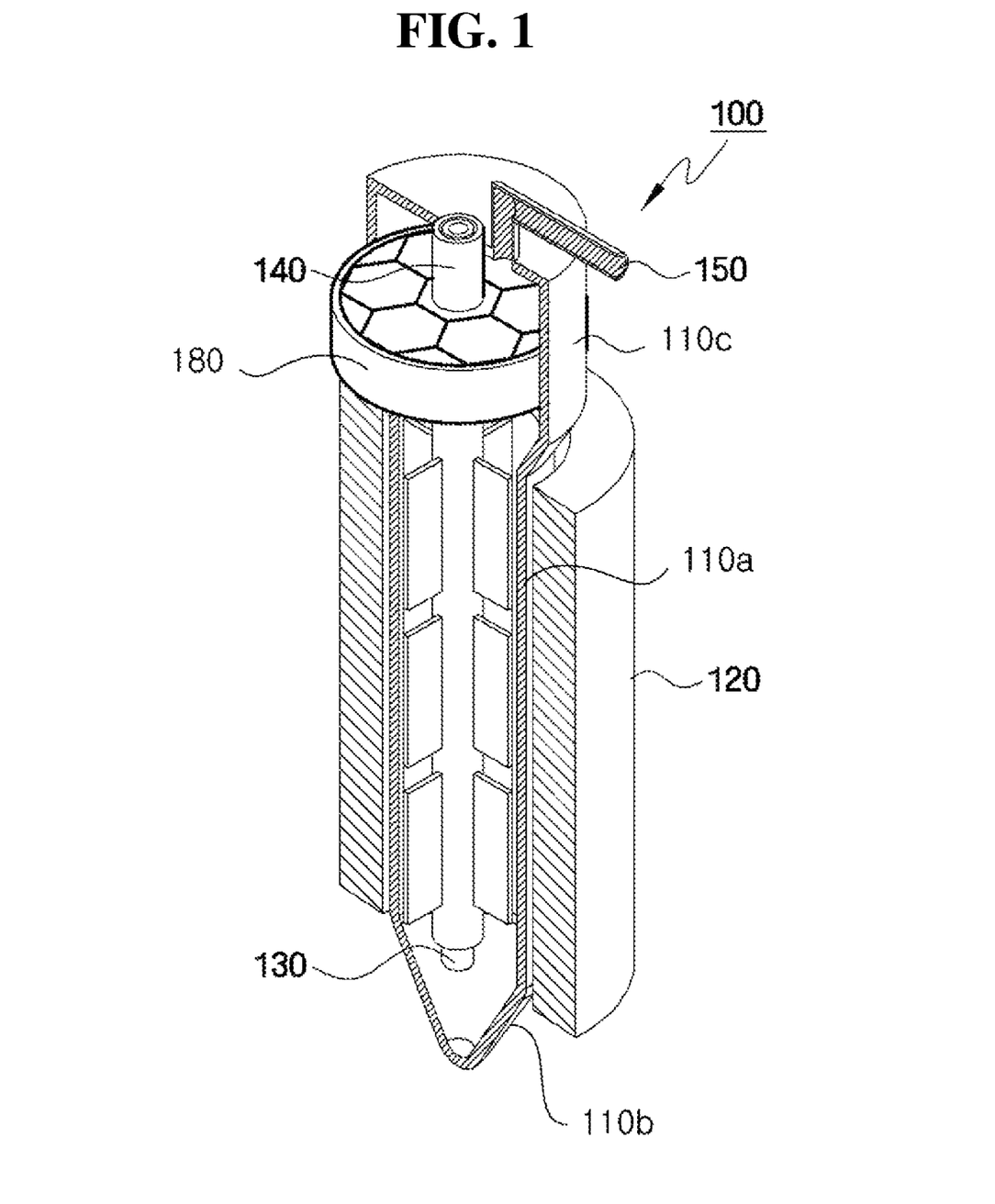
FIG. 1 is a perspective view illustrating the structure of an apparatus for synthesizing carbon nanotubes according to an exemplary embodiment of the present invention.
Figure 2:
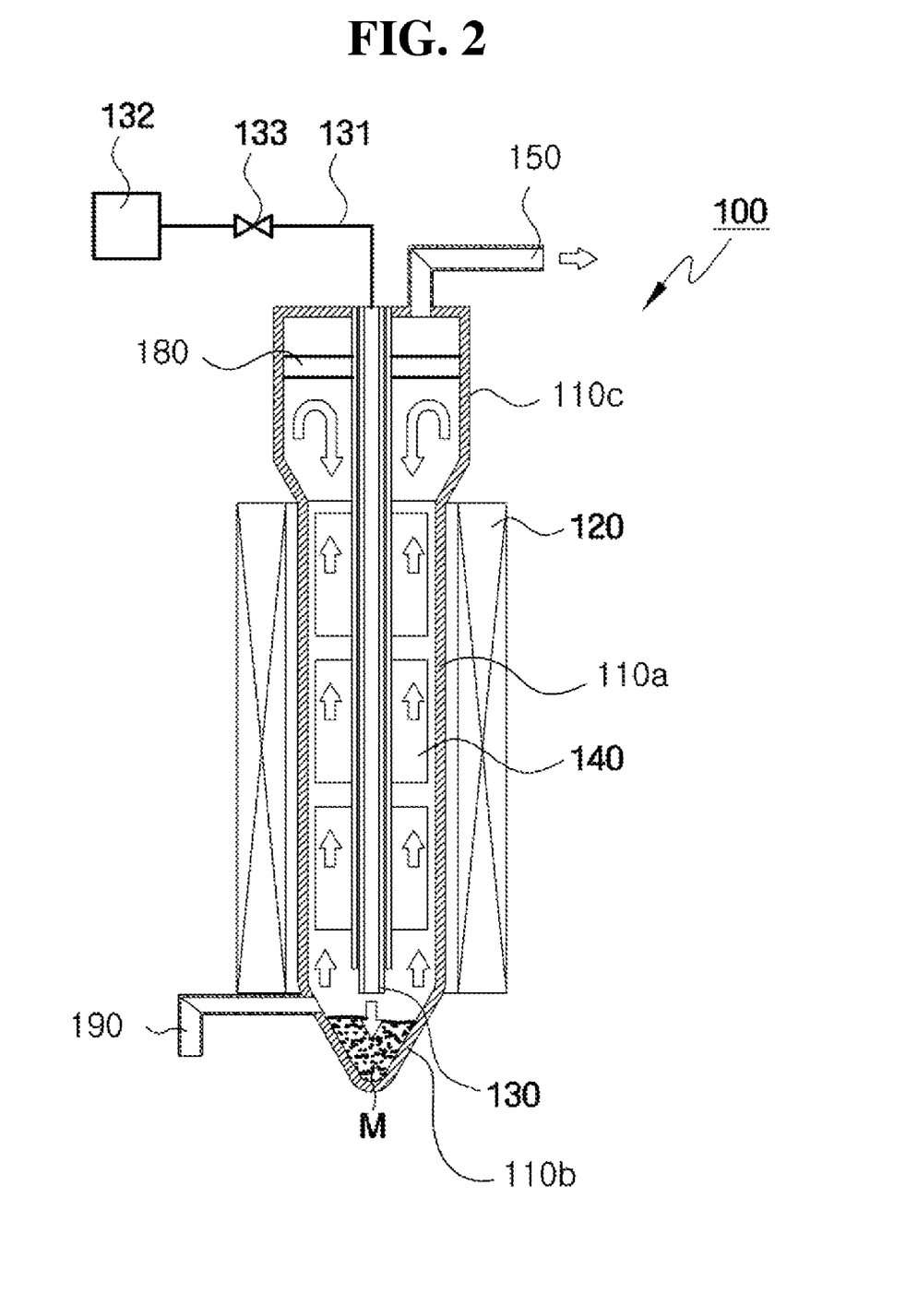
FIG. 2 is a vertical cross-sectional view illustrating the structure of an apparatus for synthesizing carbon nanotubes according to an exemplary embodiment of the present invention.
Figure 3:
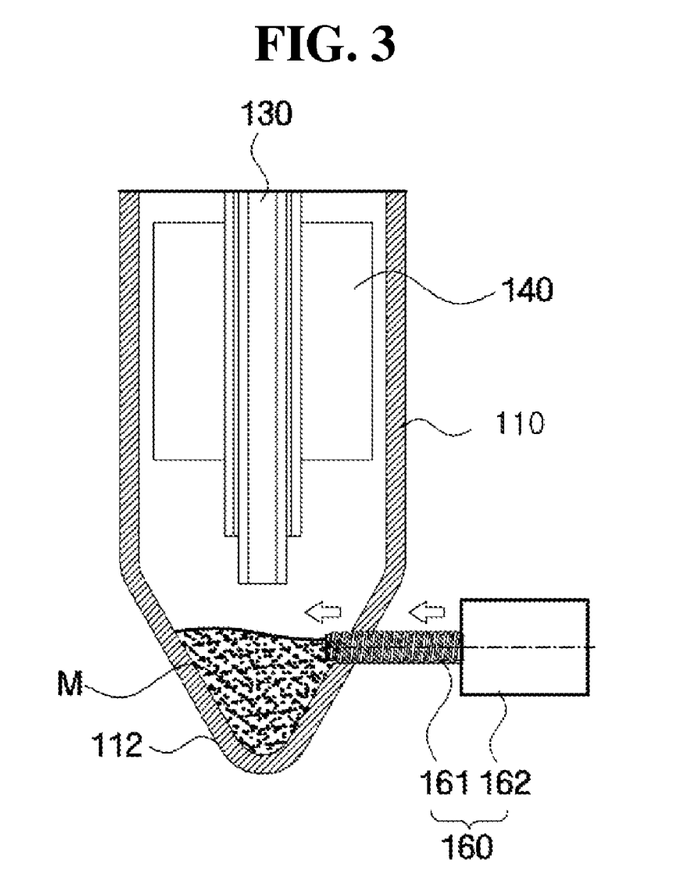
FIG. 3 illustrates an example of a catalyst-inserting unit in an apparatus for synthesizing carbon nanotubes according to an exemplary embodiment of the present invention.
Figure 4:
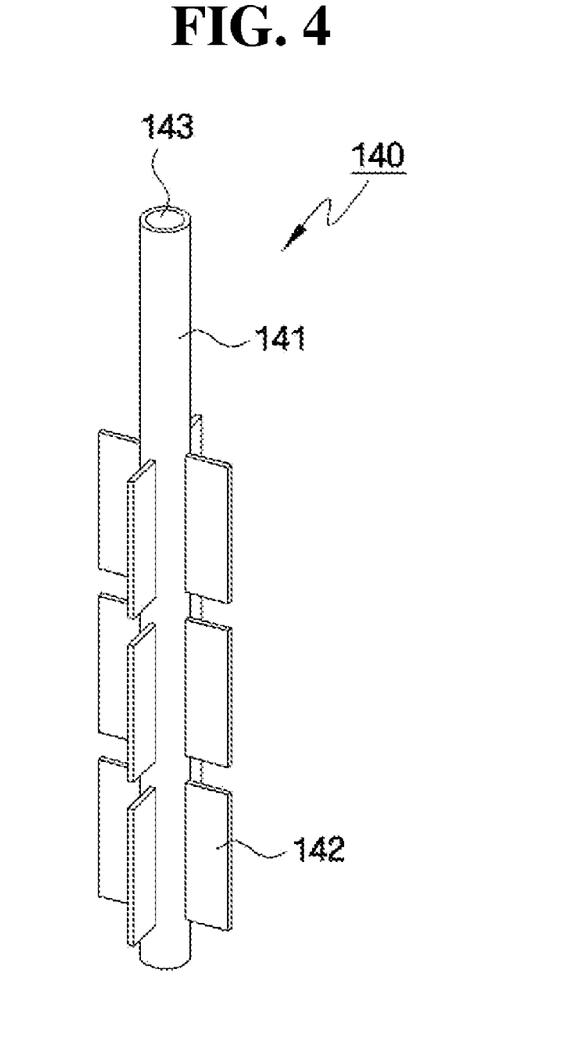
FIG. 4 is a perspective diagram illustrating the shape of a mixer in an apparatus for synthesizing carbon nanotubes according an exemplary embodiment of the present invention.
Figure 5:
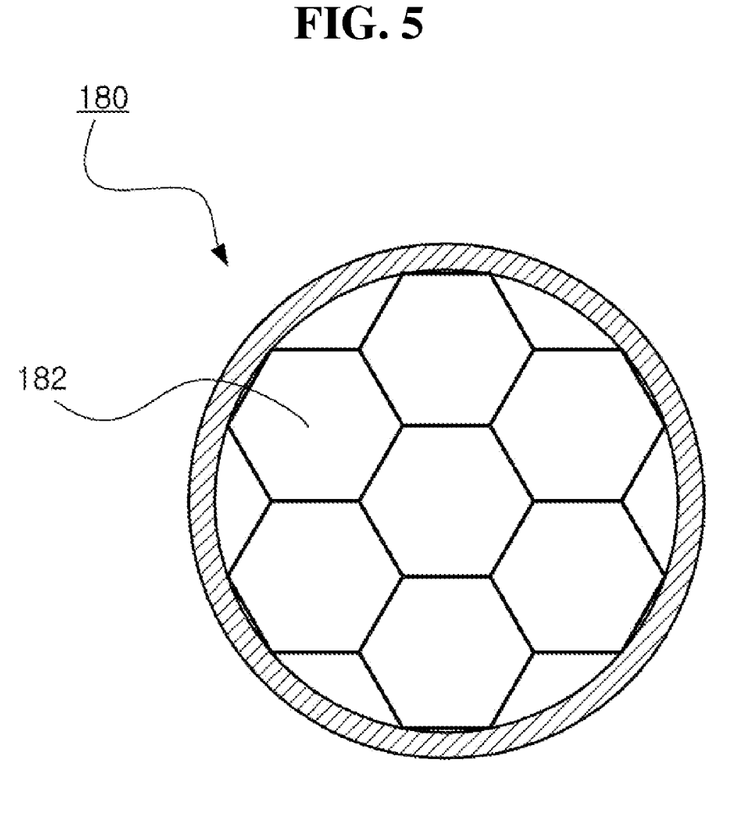
FIG. 5 illustrates a blocking unit of a honeycomb structure according to an exemplary embodiment of the present invention.
Figure 6:
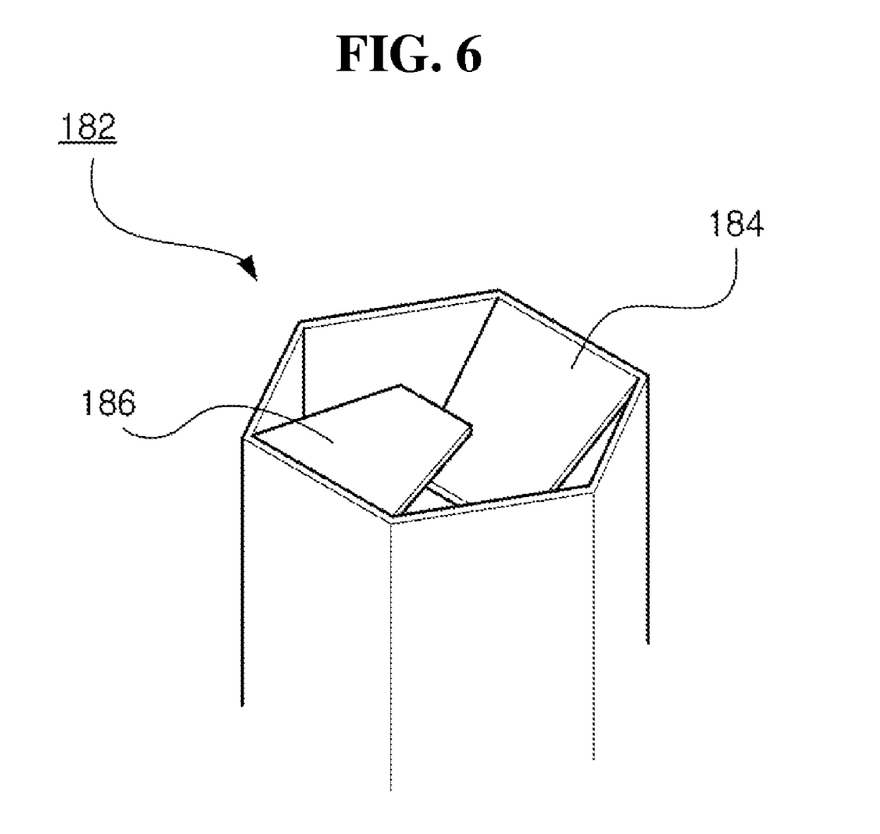
FIG. 6 is a perspective view illustrating a blocking wing formed on cells divided in a honeycomb structure.
Figure 7:
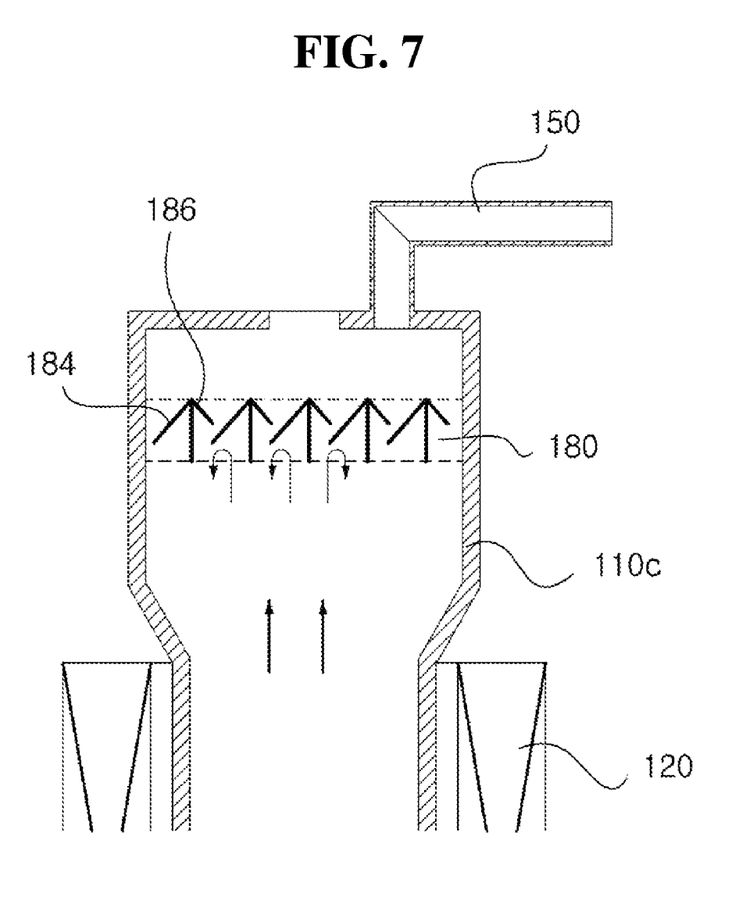
FIG. 7 is a cross-sectional view illustrating a blocking unit in an apparatus for synthesizing a carbon nano tube according to an exemplary embodiment of the present invention.
Figure 8:
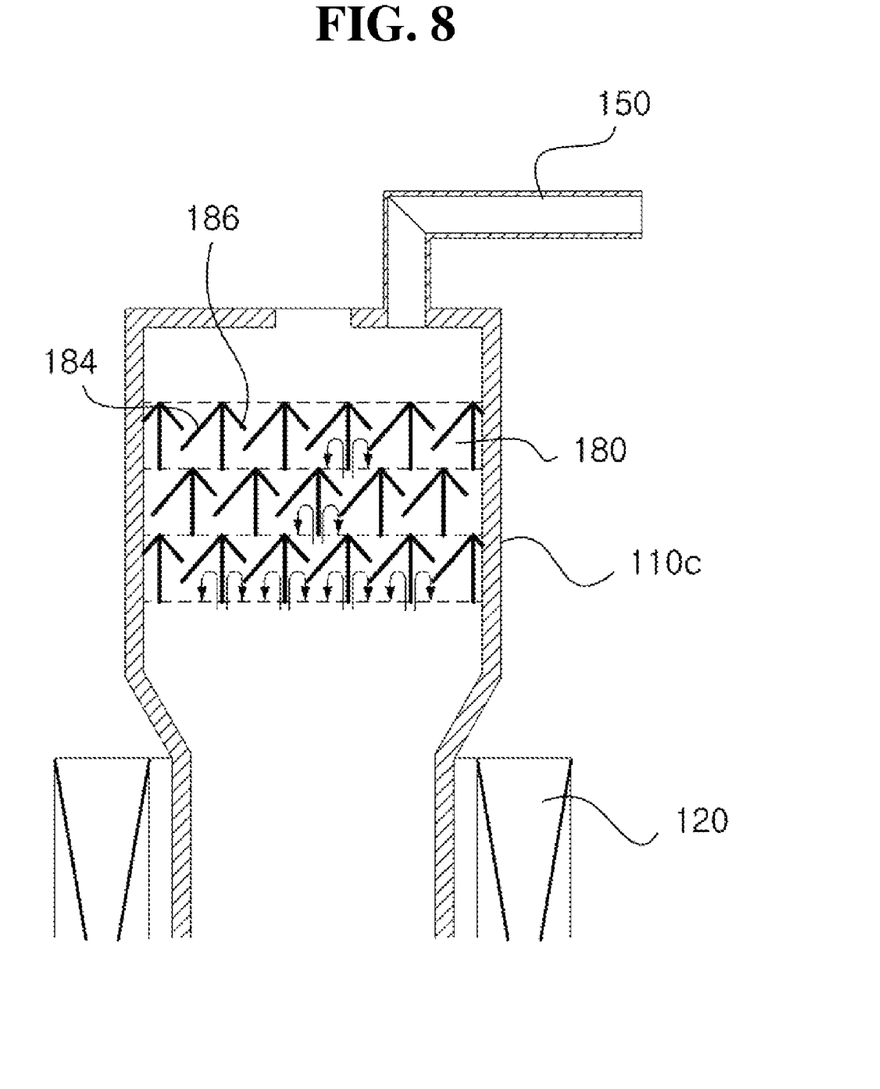
FIG. 8 is a cross-sectional view illustrating a blocking unit formed in a multi-layer in an apparatus for synthesizing carbon nanotubes according to an exemplary embodiment of the present invention.

FIG. 1 is a perspective view illustrating the structure of an apparatus for synthesizing carbon nanotubes according to an exemplary embodiment of the present invention. FIG. 2 is a vertical cross-sectional view illustrating the structure of an apparatus for synthesizing carbon nanotubes according to an exemplary embodiment of the present invention. FIG. 3 illustrates an example of a catalyst-inserting unit in an apparatus for synthesizing carbon nanotubes according to an exemplary embodiment of the present invention. FIG. 4 is a perspective diagram illustrating the shape of a mixer in an apparatus for synthesizing carbon nanotubes according an exemplary embodiment of the present invention. FIG. 5 illustrates a blocking unit of a honeycomb structure according to an exemplary embodiment of the present invention. FIG. 6 is a perspective view illustrating a blocking wing formed on cells divided in a honeycomb structure. FIG. 7 is a cross-sectional view illustrating a blocking unit in an apparatus for synthesizing a carbon nano tube according to an exemplary embodiment of the present invention. FIG. 8 is a cross-sectional view illustrating a blocking unit formed in a multi-layer in an apparatus for synthesizing carbon nanotubes according to an exemplary embodiment of the present invention.

The apparatus 100 for synthesizing carbon nanotubes according to an exemplary embodiment of the present invention may include a reaction tube 110, a heating unit 120, a gas-supply unit 130, an exhaustion unit 150, and a blocking unit 180. The apparatus may further include a mixer 140 and a catalyst-input unit 160.

The reaction tube 110 provides space where carbon nanotubes are synthesized, and can be formed vertically long. The reaction tube 110 can be provided in a vertical cylinder shape, and can be made of a heat-resistant material such as Quartz or Graphite.

It will be described later in more detail, but the reaction tube may be divided into a body 110a, a lower portion 110b, and an upper portion 110c where an exhaustion unit is formed. The cylinder-shaped reactor 110 may refer to a shape of the body 110a of the reaction tube 110. The mixer 140, which can mix the reaction gas and the catalyst (M) evenly, may be formed inside the reaction tube.

The heating unit 120 is installed at the outer side of the reaction tube 100, heats the reaction tube 110, and can heat the inside of the reaction tube 110 up to the process temperature that is necessary for synthesizing carbon nanotubes. It is desirable that the body 110a, whose synthesizing is done inside, can be heated. When the synthesizing process of the carbon nanotubes is performed, the inside of the reaction tube 110 can be kept around more than 500° C., preferably between 650° C. and 1000° C. The heating unit 120 can use a heat line (not shown) having a coil shape to cover the outside wall of the reaction tube. The configuration of the heating unit 120 is not limited to this, but can be changed by those skilled in the art.

As shown in FIG. 2, the catalyst (M), which is used for synthesizing the carbon nanotubes by reacting with the reaction gas, may be contained at the lower side of the reaction tube 110. The catalyst (M) may be metal powder or evaporated metal, preferably organic metal compound having a magnetic substance such as iron (Fe), cobalt (Co) and nickel (Ni).

Further, the catalyst-input unit 160 that provides the catalyst (M) may be connected to the lower portion 110b of the reaction tube 110.

As shown in FIG. 3, the catalyst-input unit 160 may include a catalyst-storage unit that stores manufactured catalysts and a catalyst-supply line 161 that supplies the catalyst (M) to the inside of the reaction tube 110 from the catalyst storage unit 162. FIG. 3 illustrates an example of inputting a fixed quantity of the catalyst to the inside of the reaction tube 110 according to a screw's pitch by rotating the screw inside the catalyst-supply line 161. The method of supplying the catalyst to the inside of the reaction tube 110 is not limited to this, and several other methods such as spraying the catalyst into the reaction tube 110 can be used. Further, though not illustrated, a catalyst reduction unit may be connected to the catalyst-storage unit 162, and the catalyst reduction unit can reduce the oxidized catalyst (M).

As described above, the reaction tube 110 may be formed in a vertical cylinder shape, and may be provided as a vertical cylinder shape as space where the carbon nanotubes is substantially synthesized.

Also, as illustrated in FIG. 4, the lower portion of the reaction tube 110, which contains the catalyst (M), may be in various forms to increase the floating feature of the catalyst (M). Preferably, as illustrated in FIG. 2, the lower portion of the reaction unit 110 may be formed in a conical shape in a manner that the cross section gets narrow in downward direction. Here, the conical shape may be a form that includes a corn shape or a taper shape.

As illustrated in FIG. 2, by slantly forming the lower portion of the reaction tube 110 in a conical shape, if the reaction gas is sprayed toward the catalyst by the gas-supply unit 130 to be described later, the floating catalysts (M) on the upper portion can go down along the sidewall of the body 110a of the reaction tube, and can be evenly mixed in the lower portion of the reaction tube 110. Hence, the empty space of the catalyst (M), which is contained in the end 110b of the reaction tube 110, can be filled, and by the spraying pressure of the reaction gas sprayed from a gas-supply nozzle 130, it can float inside space of the reaction tube 110.

Referring to FIG. 2, the upper portion 110c of the reaction tube 110 can be formed to have a diameter larger than the body 110a so that the catalyst (M) or the synthesized carbon nanotubes are not discharged to the exhaustion unit 150, and fall again to the body 110a by lowering the flowing speed of the catalyst or the carbon nanotubes by making the cross section of the upper portion 110c large. The flow of the catalyst (M) or the reaction gas inside the reaction tube 110 are illustrated in FIG. 2.

The gas-supply unit 130 reacts with the catalyst (M) positioned in the reaction tube 110, and sprays the reaction gas for synthesizing the carbon nanotubes. Referring to FIG. 2, the gas-supply unit 130 is horizontally installed to be directed from the upper portion 110c of the reaction tube 110 to the lower portion 110b that contains the catalyst (M), and can spray the reaction gas for synthesizing the carbon nanotubes toward the lower portion 110b in reaction to the catalyst (M). The catalyst (M) stored in the lower portion of the reaction tube 110 can float by the spaying pressure of the reaction gas sprayed through the gas-supply unit 130.

The reaction gas can use gas containing carbon such as acetylene, ethylene, methane, benzene, xylene, cyclohexane, carbon monoxide and carbon dioxide. The reaction gas can be divided into radicals by the heat pyrolysis, and such radicals can synthesize carbon nanotubes in reaction to the floating catalyst (M) from the lower portion 110b of the reaction tube 110.

Further, the gas-supply unit 130 can regulate the flowing speed of the reaction gas depending on the type of the catalyst, that is, the shape, density and size of the catalyst. Hence, as shown in FIG. 2, the pressure pump (not shown) for supplying the reaction gas to the gas supply unit and the flux regulation valve 133 can be installed on the supply pipe 131 that connects the gas-supply unit 130 and the gas-storage unit 132 that stores the reaction gas 132. The configuration of the gas supply unit 130, the supply pipe 131, the pressure pump and the flux regulation valve 133 is not limited to this, but can be changed in various forms by those skilled in the art.

Further, in addition to the gas supply unit 130, a flowing gas supply unit (not shown) for supplying flow gas into the reaction tube 110 can be provided. The flowing gas prevents the carbon nanotubes generated by the reaction between the reaction gas and the catalyst from falling to the lower portion of the reaction tube 110 by the weight of the carbon nanotubes, and can activate the reaction between the reaction gas and the catalyst (M) by forming the flowing region in side the reaction tube 110. Inert gases such as helium, nitrogen and argon can be used as a flowing gas, and some other gases such as methane, acetylene, carbon monoxide and carbon dioxide or the mixture of such a gas and argon can be used.

The exhaustion unit 150 is connected to the upper portion 110c of the reaction tube, and can discharge the non-reacted gas to the outside of the reaction tube 110. That is, after completing the carbon nanotubes synthesizing process, the non-reacted remaining gas can be discharged to the outside through the exhaustion unit 150. Such remaining gas may include some of the synthesized carbon nanotubes or catalysts (M), they are separated by a blocking unit formed inside the upper portion 110c of the reaction tube 110. Only gas may be discharged to the outside by separating the carbon nanotubes and catalysts (M) contained in the remaining gas. The discharged remaining gas may be harmful, so such gas may be treated in a scrubber (not shown) connected to the exhaustion unit 150, and may be then discharged to the outside.

An agitator may be installed inside the reaction tube 110 so that the reaction gas and catalysts (M) inside the reaction tube may be evenly mixed. As shown in FIG. 2, the agitator 140 may be installed to cover the nozzle-type gas-supply unit 130 installed long along the central axis of the reaction tube 110 from the upper portion 110c of the reaction tube 110.

A rotating impeller having multiple of wings can be used as an agitator. As shown in FIG. 4, the agitator 140 includes a cylindrical body 141 having a hollow shaft 143 to cover a gas-supply nozzle 130, and a plurality of wings 142 may be formed around the body 141. The plurality of wings may be arranged at regular intervals centering on the body, and may be arranged in multi-layers along the body. Further, wings of each layer may be crossed each other. The number of wings 142 and the arranged form may be changed by those skilled in the art according to the size of the reaction tube 110, the kind of the reaction gas, and the type of the catalysts (M).

The agitator 140 rotates centering on the hollow shaft 143 with regular cycles, and the reaction gas and catalysts (M) inside the reaction tube 110 may be evenly mixed. Hence, the agitator 140 may prevent the synthesized carbon nanotubes from being attached on the wall of the reaction tube 110, and the layer expansion rate of the catalysts (M) may be raised up. Though not illustrated, a driving unit may be connect at one end of the agitator in order to rotate the agitator 140.

A blocking unit 180 may be formed on the hollow shaft 143 of the agitator 140, and the blocking 180 unit be may be rotated along with the agitator 140 by the rotation of the agitator 140, which will be described later.

A recovery unit 190 is connected to the lower portion 110b of the reaction tube 110 to recover the synthesized carbon nanotubes by discharging the synthesized carbon nanotubes to the outside. Preferably, after completing the carbon nanotubes synthesizing process, the synthesized carbon nanotubes can be discharged and recovered by opening the gate (not shown) installed in the recovery unit 190 and keeping the reaction tube 150 in negative pressure. Here, the recovery unit 190 may be cooled to less than a certain temperature for recovering the synthesized carbon nanotubes. Though not illustrated, a pump for regulating pressure and a valve for regulating the recovered amount of the carbon nanotubes may be installed.

The blocking unit discharges only non-reacted gas to the exhaustion unit 150, and blocks the discharge of the synthesized carbon nanotubes or catalysts (M). As illustrated in FIG. 2, the blocking unit 180 is formed inside the upper portion 110c of the reaction tube 110. The reaction gas, the carbon nanotubes and catalysts (M) reach the blocking unit 180. The reaction gas is discharged to the exhaustion unit 150 via the blocking unit 180, and the carbon nanotubes and catalysts (M) are separated from the reaction gas by the blocking unit 180, and fall again.

Hereinafter, the configuration of the blocking unit 180 according to an exemplary embodiment of the present invention will be described with reference to FIGS. 5 to 8.

The cross-section of the blocking unit 180 is divided in a plurality of polygon structures, and blocking wings 184 and 186, which are slanted in the lower direction, may be formed in each polygon structure. FIG. 5 illustrates that the cross-section is a hexagon honeycomb structure. For reference, FIG. 5 does not illustrate blocking wings 184 and 186, and the blocking wings 184 and 186 will be described later with reference to FIGS. 6 and 7. Though not illustrated, the cross-section of the blocking unit 180 may be a plurality of squares structure.

Also, blocking wings 184 and 186 may be formed in each cell 182 divided in polygons. FIG. 6 is a perspective view illustrating a cell divided in a honeycomb structure, and two blocking wings 184 and 186 slanted in the lower direction are formed. As illustrated in FIG. 7, the length of the two blocking wings 184 and 186 that is connected from the two sides may be different. Preferably, as illustrated in FIG. 7, a long blocking wing 184 may be formed under the end of a short blocking wing 186. That is, when seen from the vertical bottom of the blocking unit 180, the empty space area does not exist between blocking wings 184 and 186. Hence, the carbon nanotubes and catalysts (M), which vertically ascended from the body 110a of the reaction tube 110, falls to the bottom of the reaction tube 110 by bumping the blocking wings 184 and 186. If long blocking wings 184 are not positioned at the vertical bottom of the end of the short blocking wing 186, when seen from the vertical bottom of the blocking unit 180, there comes to be empty space, so some of the carbon nanotubes and catalysts (M), which vertically ascended from the body 110a of the reaction tube 110, can penetrate the blocking unit 180, and can be discharged to the outside via the exhaustion unit 150.

The slanted angles of the blocking wings 184 and 186 may be the same, preferably 60°. The slop of the blocking wings 184 and 186 is large, so the carbon nanotubes or catalysts (M) are not piled up on the upper side of blocking wings 184 and 186, and flow downward. Hence, the carbon nanotubes or catalysts (M), which descended to the inside of the reaction tube again along the blocking wings 184 and 186 may pass through the synthesizing process again, so the productivity of the carbon nanotubes will be improved.

Further, in the present invention, blocking wings 184 and 186 are formed at each cell divided into polygon structures, so the area of each blocking wing is small. Hence, the carbon nanotubes or catalysts (M) are not easily piled up on the upper side of the blocking wings 184 and 186. In the drawings, the angles of the blocking wings 184 and 186 are the same, but it is possible to make the angles different from each other. For example, it is possible to make the downward angle of the short blocking wing 186 small and make the downward angle of the long blocking wing 184 large Also, the blocking unit 180 of an apparatus for synthesizing the carbon nanotubes according to an exemplary embodiment of the present invention may be formed of a multi-layer structure that is vertical to the reaction tube 110 as illustrated in FIG. 8. As the block unit 180 is formed of a multi-layer structure, the block unit 180 can block the discharge of the catalysts (M) and the carbon nanotubes twofold and threefold, thereby improving the capability of blocking the discharge.

Further, as illustrated in FIG. 1, the blocking unit 180 may be connected to the external body 141 of the agitator 140, and rotate with the agitator. As the block unit 180 rotates with the agitator 140, a reverse flow is formed by the blocking wings 184 and 186, thereby more effectively blocking the discharge of the carbon nanotubes and the catalysts (M).

The operation of the apparatus of synthesizing the carbon nanotubes according to an exemplary embodiment of the present invention is described in the following.

First, when the carbon nanotubes synthesizing process is started, power is supplied to the heating unit 120 and the reaction tube 110 is started to be heated, and the inside of the reaction tube 110 can be heated in the process temperature of about 650° to 1000°. Further, catalysts (M), which are reduced to the lower portion 110b of the reaction tube 110, can be supplied through the catalyst input unit 160.

If the inner temperature of the reaction tube 110 reaches the process temperature, the reaction gas may be sprayed toward the lower portion 110b of the reaction tube 110 as the reaction gas is supplied to the inner space of the reaction tube 110. The catalysts (M) and the synthesized carbon nanotubes float to the upper side of the reaction tube by the spraying pressure of the reaction gas. The reaction gas may be decomposed into radicals by heat decomposition, and such radicals can synthesize carbon nanotubes by reacting with catalysts (M) floating from the lower portion 110b of the reaction tube 110. When the synthesizing process is completed in the reaction tube 110, the supply of the reaction gas from the gas supply unit 130 may be stopped. Further, while the carbon nanotubes are synthesized, the agitator rotates with regular intervals to evenly mix the reaction gas and catalysts inside the reaction tube, and to prevent the synthesized carbon nanotubes from being attached on the inner wall of the reaction tube 110. Here, as mentioned above, the non-reacted reaction gas is discharged through the exhaustion unit 150 on the upper portion 110c of the reaction tube 110 via the blocking unit 180, and the floating carbon nanotubes and catalysts (M) are separated from the reaction gas from the blocking unit, and fall down again to be synthesized.

When the synthesizing of the carbon nanotubes are completed, the synthesized carbon nanotubes can be recovered through the recovery unit 190 connected to the lower portion 110c of the reaction tube 110.

The apparatus for synthesizing carbon nanotubes of the present invention has the following effects.

First, by forming blocking wings on each cell divided into a polygon structure, synthesized carbon nanotubes and catalysts can be effectively prevented from being discharged to the outside of the reaction tube.

Second, making synthesized carbon nanotubes or catalysts flow down by slanted blocking wings, carbon nanotubes or catalysts can be prevented from being piled up on the upper side of the blocking wings.

Third, because the size of blocking wings formed on each cell divided by a polygon structure is small, so the synthesized carbon nanotubes and catalysts can be prevented from being piled up.

Fourth, carbon nanotubes and catalysts synthesized on blocking wings are not piled up, but fall to the reaction tube again for synthesizing, thereby improving productivity.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. An apparatus for synthesizing carbon nanotubes, the apparatus comprising:
    a reaction tube that provides a space for synthesizing carbon nanotubes and is formed vertically long;
    a heating unit that is formed at the outer side of the reaction tube, and heats the reaction tube;
    a gas-supply unit that sprays reaction gas for synthesizing the carbon nanotubes by reacting with catalysts positioned inside the reaction tube;
    an exhaustion unit that is connected to the upper portion of the reaction tube, and discharges non-reacted reaction gas for synthesizing the carbon nanotubes; and
    a blocking unit that is formed inside the reaction tube, discharges only the non-reacted reaction gas for synthesizing the carbon nanotubes to the exhaustion unit, and blocks the discharge of the carbon nanotubes and catalysts,
    wherein the cross-section of the blocking unit is divided in a plurality of polygon structures, and downward-slanted blocking wings are formed at each divided cell.

2. The apparatus of claim 1, wherein the cross-section of the blocking unit is a hexagon honeycomb structure.

3. The apparatus of claim 1, wherein the cross-section of the blocking unit is divided in a plurality of square structures.

4. The apparatus of one of claims 2 and 3, wherein two blocking wings, which are slanted downward from two sides facing each other, are formed at each divided cell.

5. The apparatus of claim 4, wherein two blocking wings, which are formed at each divided cell, have different lengths, and a long blocking wing is positioned at the vertical bottom of the end of a short blocking wing.

6. The apparatus of claim 1, wherein the blocking unit is formed in a multi-layer structure in a vertical direction of the reaction tube.

7. The apparatus of claim 1, wherein the catalysts are positioned at the end of the reaction tube, and the gas-supply unit sprays reaction gas toward the catalysts by a nozzle that is connected from the upper portion of the reaction tube to the lower portion where there are the catalysts.

8. The apparatus of claim 7, further comprising an agitator that includes a cylindrical body having a hollow shaft to cover the reaction tube and a plurality of wings around the body, and rotates.

9. The apparatus of claim 8, wherein the blocking unit rotates along with the rotation of the agitator.

10. The apparatus of claim 1, wherein a catalyst-input unit, which supply the catalysts, is connected to the lower portion of the reaction tube.

* * * * *